United States Patent
Fuki et al.

(10) Patent No.: US 11,168,631 B2
(45) Date of Patent: *Nov. 9, 2021

(54) METHOD AND DEVICE FOR CONTROLLING COMPRESSION IGNITION ENGINE

(71) Applicant: Mazda Motor Corporation, Hiroshima (JP)

(72) Inventors: Kanae Fuki, Otake (JP); Kotaro Takahashi, Hiroshima (JP); Toru Kobayashi, Hiroshima (JP); Hiromu Sugano, Higashihiroshima (JP); Masahiro Tateishi, Hatsukaichi (JP); Ryohei Karatsu, Hiroshima (JP); Takamitsu Miyahigashi, Kure (JP); Jiro Yamasaki, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 121 days.

This patent is subject to a terminal disclaimer.

(21) Appl. No.: 16/464,557

(22) PCT Filed: Nov. 30, 2016

(86) PCT No.: PCT/JP2016/085598
§ 371 (c)(1),
(2) Date: May 28, 2019

(87) PCT Pub. No.: WO2018/100690
PCT Pub. Date: Jun. 7, 2018

(65) Prior Publication Data
US 2021/0102508 A1 Apr. 8, 2021

(51) Int. Cl.
*F02D 41/08* (2006.01)

(52) U.S. Cl.
CPC ...... *F02D 41/086* (2013.01); *F02D 2200/021* (2013.01); *F02D 2200/101* (2013.01)

(58) Field of Classification Search
CPC ............. F02D 41/086; F02D 2200/021; F02D 2200/101
(Continued)

(56) References Cited

U.S. PATENT DOCUMENTS 10,883,464 B2 * 1/2021 Fuki ...................... F02D 41/062
10,890,122 B2 * 1/2021 Fuki ...................... F02D 41/40

FOREIGN PATENT DOCUMENTS

EP 1505287 A2 2/2005
EP 2716898 A1 4/2014
(Continued)

OTHER PUBLICATIONS

JP4385894B2 (Hisafumi Magata) (Dec. 16, 2009) (Machine Translation) Retrieved from Japanese Patent Office on Apr. 27, 2021.*

*Primary Examiner* — Mahmoud Gimie
(74) *Attorney, Agent, or Firm* — Alleman Hall Creasman & Tuttle LLP

(57) ABSTRACT

A system for controlling a compression ignition engine includes: a speed obtaining section which detects or estimates an engine speed achieved by combustion in an n-th cycle; and an injection amount setting section which sets, in a start period after the start of cranking, a fuel injection amount to be injected by injectors in an (n+1)-th cycle. If the engine speed achieved by the combustion in the n-th cycle falls in the resonance range, the injection amount setting section sets the fuel injection amount for an (n+1)-th cycle to be larger than the fuel injection amount injected when the engine speed is higher than or equal to an upper limit of the resonance range.

6 Claims, 10 Drawing Sheets

(58) Field of Classification Search
USPC .......................................................... 701/104
See application file for complete search history.

(56) References Cited

FOREIGN PATENT DOCUMENTS

| | | | | |
|---|---|---|---|---|
| JP | 2006063833 | A | 3/2006 | |
| JP | 2009228538 | A | 10/2009 | |
| JP | 4385894 | B2 * | 12/2009 | ............ F02D 41/06 |
| JP | 2010203423 | A | 9/2010 | |
| JP | 2015113774 | A | 6/2015 | |

* cited by examiner

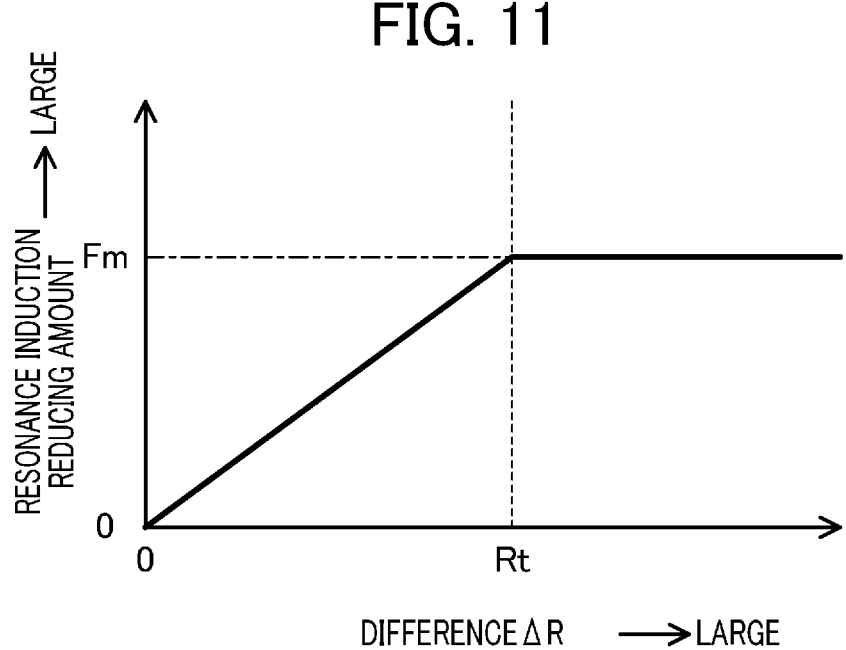

METHOD AND DEVICE FOR CONTROLLING COMPRESSION IGNITION ENGINE

TECHNICAL FIELD

The technique disclosed herein relates to a method and a system for controlling a compression ignition engine.

BACKGROUND ART

Patent Document 1 discloses an engine control system. Specifically, the control system (an ignition timing control system) according to Patent Document 1 is configured to advance the ignition timing, with respect to the ignition timing in an idle operation, in a period from immediately after the start of the engine until the engine speed passes through a resonance speed range (a vehicle resonance band). According to this system, the torque (the output) of the engine increases by an amount corresponding to the advance of the ignition timing. It is therefore possible to increase the rate of increase in the engine speed and thus to quickly pass through the resonance speed range.

CITATION LIST

Patent Document

Patent Document 1: Japanese Unexamined Patent Publication No. 2015-113774

SUMMARY OF THE INVENTION

Technical Problem

In a compression ignition engine such as a diesel engine, a method of increasing the torque in the start period, such as the method disclosed in Patent Document 1, includes, for example, setting a relatively large fuel injection amount in a period from the start of the engine (the start of cranking) to the completion of the start (reaching to the idle speed). This configuration can increase the torque of the engine by the increased amount of fuel injection, and allows the engine speed to quickly pass through the resonance speed range. This is advantageous in completing the start-up quickly and thus reducing the influence of resonance. However, a compression ignition engine has a larger compression ratio than a general spark-ignited engine, and therefore exhibits relatively great fluctuation of the torque. When the torque fluctuation is increased, the vibration of the entire vehicle due to the torque fluctuation is increased. That is, although for a short period of time, vibrations of the vehicle as a whole may not be reduced sufficiently in exchange for the quick completion of the start-up. Further, the combustion noise becomes large if the engine speed is increased to an idle speed while maintaining a large fuel injection amount, which is not preferable.

In view of the foregoing background, it is therefore an object of the present disclosure to cause the engine speed to quickly pass through a resonance speed range, and reduce vibrations of a vehicle caused by torque fluctuation and reduce the combustion noise, at the start of a compression ignition engine.

Solution to the Problem

The technique disclosed herein relates to a method of controlling a compression ignition engine having a fuel injection valve which supplies fuel into a combustion chamber. The method includes: an engine start step in which an engine speed is increased to a predetermined idle speed; a speed obtaining step in which a present engine speed is detected or estimated, the present engine speed being an engine speed achieved by combustion in an n-th cycle, where n is a positive integer; and an injection amount setting step in which a fuel injection amount to be injected by the fuel injection valve in an (n+1)-th cycle is set, based on the present engine speed, in a period until the engine speed reaches the idle speed.

The injection amount setting step includes, if the present engine speed falls in a resonance speed range which is lower than the idle speed, setting the fuel injection amount to be larger than the fuel injection amount injected when the engine speed is higher than or equal to an upper limit of the resonance speed range.

The "compression ignition engine" as used herein includes both of a diesel engine and a gasoline engine, such as a compression ignition gasoline engine.

The "combustion chamber" as used herein is not limited to a space defined when the piston reaches a compression top dead center. The term "combustion chamber" is used in a broad sense.

The "cycle" as used herein is not limited to when the fuel is burnt. For example, completion of a set of reciprocating movements corresponding to an intake stroke, a compression stroke, an expansion stroke, and an exhaust stroke by the piston at the time of cranking is assumed to be completion of one cycle. In other words, the term "cycle" as used herein also includes when the fuel injection amount is zero.

Further, the "cycle" as used herein is not counted up independently for each cylinder, but is counted up for all the cylinders together. In a case, for example, of a 4-cylinder engine, the number of the cycles is incremented by one every time the crankshaft turns 180 degrees.

The "resonance speed range" as used herein refers to, for example, a speed range which includes engine speeds corresponding to a resonant frequency of the powertrain including the compression ignition engine and which is lower than an idle speed.

According to this method, the fuel injection amount for the (n+1)-th cycle is determined by taking into account the present engine speed achieved by the combustion in the previous n-th cycle.

Specifically, when the present engine speed falls in the resonance speed range, the fuel injection amount for the (n+1)-th cycle is set to be larger than the fuel injection amount injected when the engine speed is higher than or equal to the upper limit of the speed range. The engine speed can quickly pass through the resonance speed range by the increased fuel injection amount.

In other words, the engine speed is not increased to the idle speed while maintaining a greater fuel injection amount, but is set to be smaller, when the present engine speed is higher than or equal to the upper limit of the resonance speed range, than the fuel injection amount injected when the engine speed falls in the resonance speed range. It is therefore possible to reduce the torque fluctuation by an amount corresponding to the reduction in the fuel injection amount, and thus to reduce the forced vibration caused by the torque fluctuation. This is advantageous in reducing the combustion noise.

According to this method, it is therefore possible to cause the engine speed to quickly pass through the resonance speed range, and reduce vibrations of a vehicle caused by torque fluctuation and the combustion noise.

The method may further include an in-cylinder temperature obtaining step in which a temperature in the combustion chamber is detected or estimated, wherein the injection amount setting step includes, if the present engine speed falls in the resonance speed range, setting the fuel injection amount to be a limit value determined in accordance with the temperature in the combustion chamber.

The vaporization characteristics depend on the in-cylinder temperature. For example, more fuel is allowed to be injected when the in-cylinder temperature is low, than when the in-cylinder temperature is high, because less fuel is vaporized when the in-cylinder temperature is low. A limit value as an upper limit corresponding to the vaporization characteristics is given to the fuel injection amount. In the injection amount setting step, the fuel injection amount is increased to the limit value if the present engine speed falls in the resonance speed range. This method is advantageous in that the engine speed can pass through the resonance speed range more quickly by the increased fuel injection amount than in a case, for example, where the fuel injection amount is set to be smaller than the limit value.

The method may further include a cooling water temperature obtaining step in which a temperature of engine cooling water is detected, wherein the in-cylinder temperature obtaining step may include detecting or estimating the in-cylinder temperature, based on a value detected in the cooling water temperature obtaining step.

The injection amount setting step may include if the present engine speed falls in the resonance range, setting the fuel injection amount to be larger than a fuel injection amount that is set when the compression ignition engine is in an idle operation.

This method is advantageous in that the engine speed can quickly pass through the resonance speed range by the increased fuel injection amount.

Another technique disclosed herein relates to a system for controlling a compression ignition engine having a fuel injection valve which supplies fuel into a combustion chamber. The system includes: an engine starter which increases an engine speed to a predetermined idle speed; a speed obtaining section which detects or estimates a present engine speed which is an engine speed achieved by combustion in an n-th cycle, where n is a positive integer; and an injection amount setting section which sets a fuel injection amount to be injected by the fuel injection valve in an (n+1)-th cycle, based on the present engine speed, in a period until the engine speed reaches the idle speed.

If the present engine speed falls in a resonance speed range which is lower than the idle speed, the injection amount setting section sets the fuel injection amount to be larger than the fuel injection amount injected when the engine speed is higher than or equal to an upper limit of the resonance speed range.

According to this configuration, it is possible to cause the engine speed to quickly pass through the resonance speed range, and reduce vibrations of a vehicle caused by torque fluctuation and reduce the combustion noise.

The system may further include an in-cylinder temperature obtaining section which detects or estimates a temperature in the combustion chamber, wherein the injection amount setting section may set the fuel injection amount to be smaller than or equal to a limit value determined in accordance with the temperature in the combustion chamber, and if the present engine speed falls in the resonance speed range, may set the fuel injection amount to be the limit value.

This configuration is advantageous in that the engine speed can pass through the resonance speed range more quickly by the increased fuel injection amount than in a case, for example, where the fuel injection amount is set to be smaller than the limit value.

The system may further include a cooling water temperature obtaining section which detects a temperature of engine cooling water, wherein the in-cylinder temperature obtaining section may detect or estimate the in-cylinder temperature, based on a value detected by the cooling water temperature obtaining section.

If the present engine speed falls in the resonance speed range, the injection amount setting section may set the fuel injection amount to be larger than a fuel injection amount that is set when the compression ignition engine is in an idle operation.

This method is advantageous in that the engine speed can quickly pass through the resonance speed range by the increased fuel injection amount.

Advantages of the Invention

According to this method and the system for controlling the compression ignition engine, it is possible to cause the engine speed to quickly pass through the resonance speed range, and reduce vibrations of a vehicle caused by torque fluctuation and reduce the combustion noise.

BRIEF DESCRIPTION OF THE DRAWINGS

FIG. 11 is a diagram illustrating changes in the fuel injection amount with respect to a difference between the engine speed and an upper limit of a resonance range.

DESCRIPTION OF EMBODIMENTS

Figure 1:
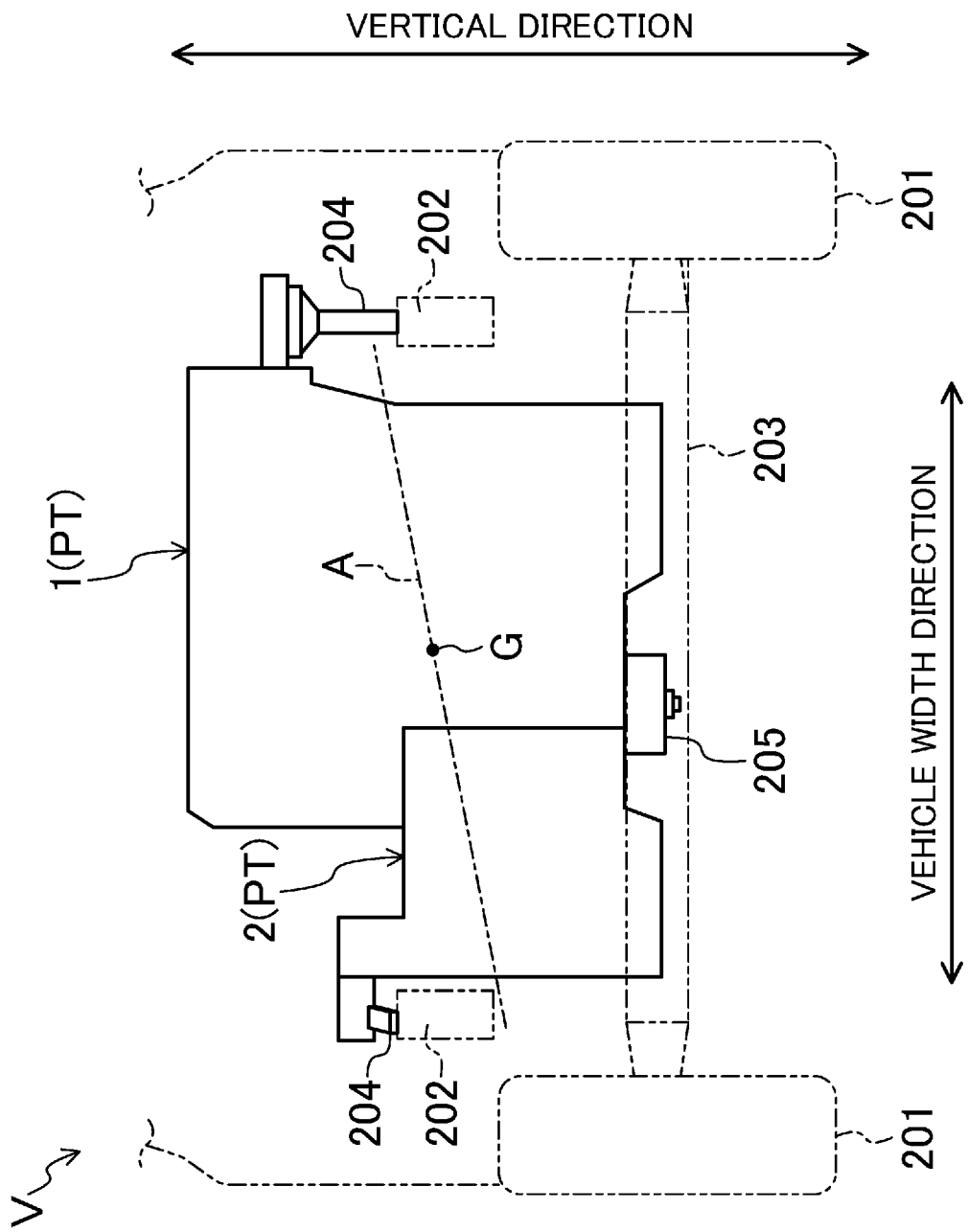
FIG. 1 is a diagram illustrating a rear view of a front part of a vehicle provided with a compression ignition engine.
Figure 2:
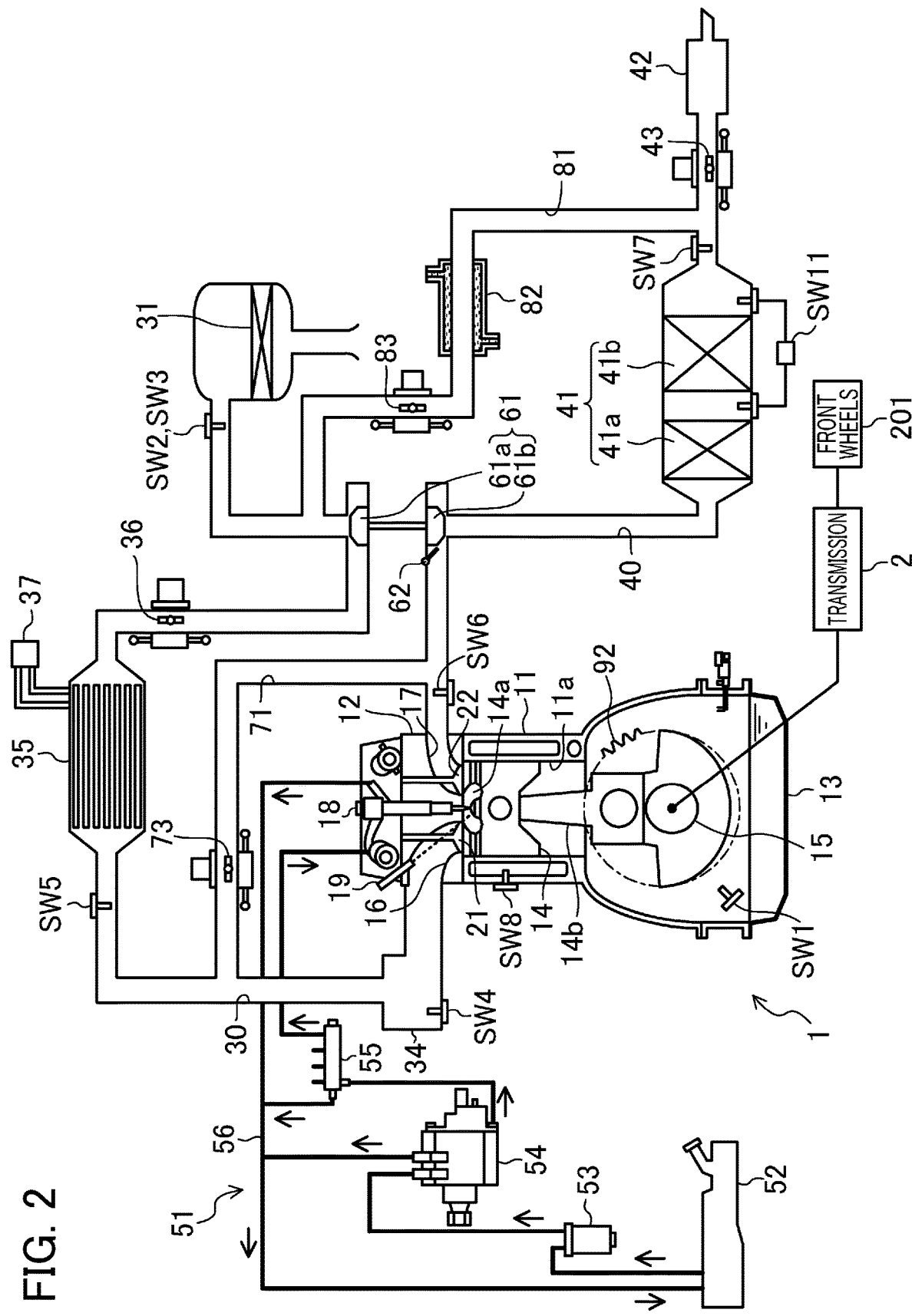
FIG. 2 is a diagram illustrating a configuration of the compression ignition engine.
Figure 3:
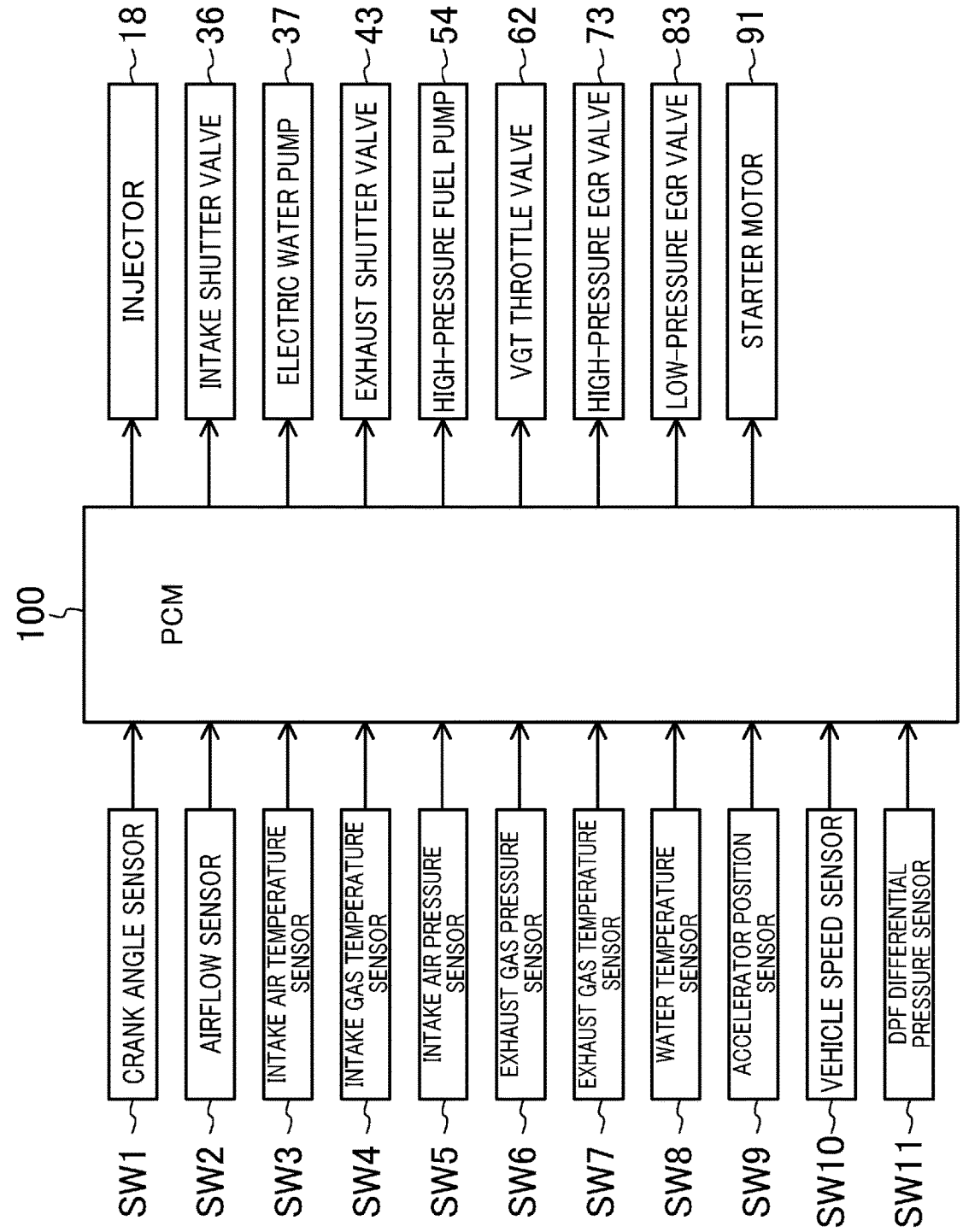
FIG. 3 is a diagram illustrating a block diagram associated with control of the compression ignition engine.

Embodiments of a method and a system for controlling a compression ignition engine will be described in detail below with reference to the drawings. The following description is only an example. FIG. 1 is a diagram illustrating a rear view of a front part of a vehicle provided with a compression ignition engine. FIG. 2 is a diagram illustrating a configuration of a compression ignition engine, and FIG. 3 is a block diagram illustrating a control of a compression ignition engine.

The compression ignition engine (hereinafter referred to as an "engine") 1 according to the present embodiment is mounted in a front-engine, front-drive, four-wheel vehicle (hereinafter referred to as a "vehicle") V. The engine 1 forms the powertrain PT of the vehicle V.

A configuration related to the powertrain PT, particularly a support structure, will be described first.

(Configuration of Powertrain)

The powertrain PT includes the engine 1 and a transmission 2. The powertrain PT changes, in the transmission 2, the speed of the output of the engine 1, and transmits the output having the changed speed to front wheels 201 of the vehicle V.

The vehicle body of the vehicle V includes a plurality of frames. For example, a pair of right and left front side frames 202 extending in the longitudinal direction of the vehicle V are disposed at both ends of the powertrain PT in the vehicle width direction. A subframe 203 is bridged below the front side frames 202 in the vehicle width direction.

Turning to the explanation of the powertrain PT, as illustrated in FIG. 1, the powertrain PT according to the present embodiment employs a pendulum support structure. Specifically, the upper parts of both ends of the powertrain PT in the vehicle width direction (namely, parts of the powertrain PT located above the center of gravity G) are supported by the front side frames 202 via respective engine mounts 204. The engine mounts 204 have elastic force, and support and suspend both the ends of the powertrain PT.

In the case of employing the pendulum type, the powertrain PT vibrates so as to rotate about a roll axis A extending substantially in the vehicle width direction, using torque variations at the time, for example, when the engine 1 operates as vibration force. In order to reduce such vibrations, the lower part of the powertrain PT (namely, part of the powertrain PT located below the center of gravity G) is coupled to the subframe 203 via a torque rod 205.

Note that the resonance frequency at the time when the powertrain PT vibrates is determined depending on the hardware structure or the support structure of the powertrain PT. Although not described in detail, the resonance frequency according to this embodiment is adjusted so that the engine speed corresponding to the resonance frequency (hereinafter referred to as a "resonance speed") Rr is at least lower than an idle speed Ri of the engine 1. The idle speed Ri is set so as not to cause engine stall when, for example, the vehicle V does not travel and when the accelerator pedal is not depressed.

Now, general configurations of the engine 1 will be described.

(General Configuration of Engine)

The engine 1 is an inline 4-cylinder, 4-cycle diesel engine. However, the engine 1 is not limited to a diesel engine. The technique disclosed herein is applicable to, for example, a compression ignition gasoline engine.

As shown in FIG. 2, the engine 1 includes a cylinder block 11 provided with four cylinders 11*a* (only one is shown), a cylinder head 12 located above the cylinder block 11, and an oil pan 13 located below the cylinder block 11 and storing lubricant. A piston 14 is slidably fitted into each of the cylinders 11*a*. The top surface of the piston 14 has a cavity defining a combustion chamber 14*a*. The piston 14 is coupled to a crankshaft 15 via a connecting rod 14*b*. The crankshaft 15 is coupled to the transmission 2 described above. A trigger plate 92 is attached to the crankshaft 15. The trigger plate 92 rotates integrally with the crankshaft 15.

Note that the "combustion chamber" is not limited to a space defined when the piston 14 reaches a compression top dead center. The term "combustion chamber" may sometimes be used in a broad sense. That is, the "combustion chamber" may denote the space defined by the piston 14, the cylinder 11*a*, and the cylinder head 12, regardless of the position of the piston 14.

The geometric compression ratio of the engine 1 is set to 14. This setting is a mere example, and may be changed as appropriate.

The cylinder block 11 is provided with a starter motor 91 (shown only in FIG. 3) for starting the engine 1. The starter motor 91 detachably meshes with a ring gear (not shown), which is coupled to an end portion of the crankshaft 15. The starter motor 91 is driven to start the engine 1. The starter motor 91 meshes with the ring gear to transmit power of the starter motor 91 to the ring gear, thereby rotating and driving the crankshaft 15.

The cylinder head 12 includes two intake ports 16 and two exhaust ports 17 for each cylinder 11*a*. Both the intake ports 16 and the exhaust ports 17 communicate with the corresponding one of the combustion chambers 14*a*. Each intake port 16 is provided with an intake valve 21 for opening and closing an opening at the combustion chamber 14*a*. Similarly, each exhaust port 17 is provided with an exhaust valve 22 for opening and closing an opening at the combustion chamber 14*a*.

An injector 18 for each cylinder 11*a* is attached to the cylinder head 12. The injector 18 directly injects fuel into the cylinder 11*a*, thereby feeding the fuel into corresponding one of the combustion chambers 14*a*. The injector 18 is an example of a "fuel injection valve."

Specifically, the fuel is fed to the injector 18 from a fuel tank 52 via a fuel feeding system 51. This fuel feeding system 51 includes a low-pressure electric fuel pump (not shown) provided inside the fuel tank 52, a fuel filter 53, a high-pressure fuel pump 54, and a common rail 55. The high-pressure fuel pump 54 is driven by a rotating member (e.g. a camshaft) of the engine 1. The high-pressure fuel pump 54 pumps low-pressure fuel, which has been fed from the fuel tank 52 via the low-pressure fuel pump and the fuel filter 53, to the common rail 55 at a high pressure. The common rail 55 stores the pumped fuel at the high pressure. The fuel stored in the common rail 55 is injected from the injector 18 into the combustion chamber 14*a* by operation of the injector 18. Note that the excessive fuel generated in the low-pressure fuel pump, the high-pressure fuel pump 54, the common rail 55, and the injector 18 returns via a return passage 56 (directly in the case of the excessive fuel generated in the low-pressure fuel pump) to the fuel tank 52. The configuration of the fuel feeding system 51 is not limited thereto.

The cylinder head 12 includes a glow plug 19 for each cylinder 11*a*. The glow plug 19 warms gas which has been sucked into the cylinder 11*a* at cold start of the engine 1 to improve fuel ignitionability.

An intake passage 30 is connected to one side surface of the engine 1. The gas to be introduced into the combustion chambers 14*a* flows through the intake passage 30. On the other hand, an exhaust passage 40 is connected to the other side surface of the engine 1. The exhaust gas discharged from the combustion chambers 14*a* flows through the exhaust passage 40. The intake and exhaust passages 30 and 40 are provided with a turbo supercharger 61 that supercharges gas.

Specifically, the intake passage 30 communicates with the intake ports 16 of each cylinder 11*a*. An air cleaner 31 filtering fresh air is provided at the upstream end of the intake passage 30. A surge tank 34 is provided near the downstream end of the intake passage 30. Although not shown in detail, a portion of the intake passage 30 downstream of the surge tank 34 serves as independent passages, each branches off to one of the cylinders 11a. Each of the independent passages has a downstream end connected to the intake ports 16 of the corresponding one of the cylinders 11a.

In the intake passage 30 between the air cleaner 31 and the surge tank 34, a compressor 61a of the turbo supercharger 61, an intake shutter valve 36, and an intercooler 35 are arranged sequentially from the upstream side. The intercooler 35 cools the gas compressed by the compressor 61a. The intake shutter valve 36 is basically fully open. The intercooler 35 is configured to cool the gas using cooling water fed by an electric water pump 37.

On the other hand, the exhaust passage 40 communicates with the exhaust ports 17 of each cylinder 11a. Specifically, although not shown in detail, an upstream portion of the exhaust passage 40 serves as independent passages, each branches off to one of the cylinders 11a. Each of the independent passages has an upstream end connected to the exhaust ports 17 of the corresponding one of the cylinders 11a. A portion of the exhaust passage 40 downstream of the independent passages serves as a collector, into which the independent passages converge.

In portions of the exhaust passage 40 downstream of the collector, a turbine 61b of the turbo supercharger 61, an exhaust gas purifier 41, and a silencer 42 are disposed sequentially from the upstream side. The exhaust gas purifier 41 purifies harmful components in the exhaust gas of the engine 1. The exhaust gas purifier 41 includes an oxidation catalyst 41a and a diesel particulate filter (hereinafter referred to as a "DPF") 41b sequentially from the upstream side. The oxidation catalyst 41a includes an oxidation catalyst which supports platinum, a mixture of platinum and palladium, or any other component, and promotes reactions in which CO and HC in the exhaust gas are oxidized to generate $CO_2$ and $H_2O$. On the other hand, the DPF 41b traps and collects fine particles such as soot contained in the exhaust gas of the engine 1. The DPF 41b may be coated with an oxidation catalyst.

The turbo supercharger 61 includes, as described above, the compressor 61a disposed in the intake passage 30, and the turbine 61b disposed in the exhaust passage 40. The turbine 61b rotates in response to an exhaust gas flow. The rotation of the turbine 61b causes the compressor 61a coupled to the turbine 61b to operate. Once the compressor 61a operates, the turbo supercharger 61 compresses the gas to be introduced into the combustion chambers 14a. A VGT throttle valve 62 is provided near the upstream side of the turbine 61b in the exhaust passage 40. The opening degree (i.e. throttling) of the VGT throttle valve 62 is controlled to adjust the flow speed of the exhaust gas to be transmitted to the turbine 61b.

The engine 1 causes part of the exhaust gas to flow back to the intake passage 30 from the exhaust passage 40. To realize the backflow of the exhaust gas, a high-pressure EGR passage 71 and a low-pressure EGR passage 81 are provided.

The high-pressure EGR passage 71 connects a portion of the exhaust passage 40 between the collector and the turbine 61b of the turbo supercharger 61 (i.e., a portion upstream of the turbine 61b of the turbo supercharger 61) to a portion of the intake passage 30 between the surge tank 34 and the intercooler 35 (i.e., a portion downstream of the compressor 61a of the turbo supercharger 61). In the high-pressure EGR passage 71, a high-pressure EGR valve 73 is disposed, which adjusts the backflow rate of the exhaust gas through the high-pressure EGR passage 71.

The low-pressure EGR passage 81 connects a portion of the exhaust passage 40 between the exhaust gas purifier 41 and the silencer 42 (i.e., a portion downstream of the turbine 61b of the turbo supercharger 61) to a portion of the intake passage 30 between the compressor 61a of the turbo supercharger 61 and the air cleaner 31 (i.e., a portion upstream of the compressor 61a of the turbo supercharger 61). In the low-pressure EGR passage 81, a low-pressure EGR cooler 82 and a low-pressure EGR valve 83 are disposed. The low-pressure EGR cooler 82 cools the exhaust gas passing through the low-pressure EGR passage 81. The low-pressure EGR valve 83 adjusts the backflow rate of the exhaust gas through the low-pressure EGR passage 81.

The system for controlling the compression ignition engine is configured as a powertrain control module (PCM) 100 for controlling the engine 1 and hence the entire powertrain PT. The PCM 100 is a controller including a known microcomputer as a base element. The PCM 100 also includes a central processing unit (CPU), a memory such as a random access memory (RAM) and a read only memory (ROM), and an input and output (I/O) bus. The CPU executes programs. The memory stores programs and data. The I/O bus inputs and outputs electrical signals.

As shown in FIGS. 2 and 3, various types of sensors SW1 to SW11 are connected to the PCM 100. The sensors SW1 to SW11 output respective detection signals to the PCM 100. The sensors SW1 to SW11 include the following sensors.

Specifically, an airflow sensor SW2 is located downstream of the air cleaner 31 in the intake passage 30, and detects the flow rate of fresh air flowing through the intake passage 30. An intake air temperature sensor SW3 detects the temperature of the fresh air. An intake air pressure sensor SW5 is located downstream of the intercooler 35, and detects the pressure of the gas which has passed through the intercooler 35. An intake gas temperature sensor SW4 is attached to the surge tank 34, and detects the temperature of the gas to be fed into the cylinders 11a. A water temperature sensor SW8 is attached to the engine 1, and detects the temperature of engine cooling water (hereinafter referred to as a "cooling water temperature"). A crank angle sensor SW1 detects the rotation angle of the crankshaft 15. An exhaust gas pressure sensor SW6 is provided near a connecting portion of the exhaust passage 40 with the high-pressure EGR passage 71, and detects the pressure of the exhaust gas exhausted from the combustion chambers 14a. A DPF differential pressure sensor SW11 detects the differential pressure of the exhaust gas before and after passing through the DPF 41b. An exhaust gas temperature sensor SW7 detects the temperature of the exhaust gas after passing through the DPF 41b. An accelerator position sensor SW9 detects the accelerator position corresponding to the amount of depression of the accelerator pedal. A vehicle speed sensor SW10 detects the rotation speed of the output shaft of the transmission 2.

The PCM 100 determines the operating state of the engine 1 and the traveling state of the vehicle V based on detection signals of these sensors, and calculates control variables of each actuator according to the operating state of the engine 1 and the traveling state of the vehicle V. The PCM 100 outputs the control signals associated with the obtained control variables, for example, to the injector 18, the intake shutter valve 36, the electric water pump 37, an exhaust shutter valve 43, the high-pressure fuel pump 54, the VGT throttle valve 62, the high-pressure EGR valve 73, the low-pressure EGR valve 83, and the starter motor 91.

Figure 5:
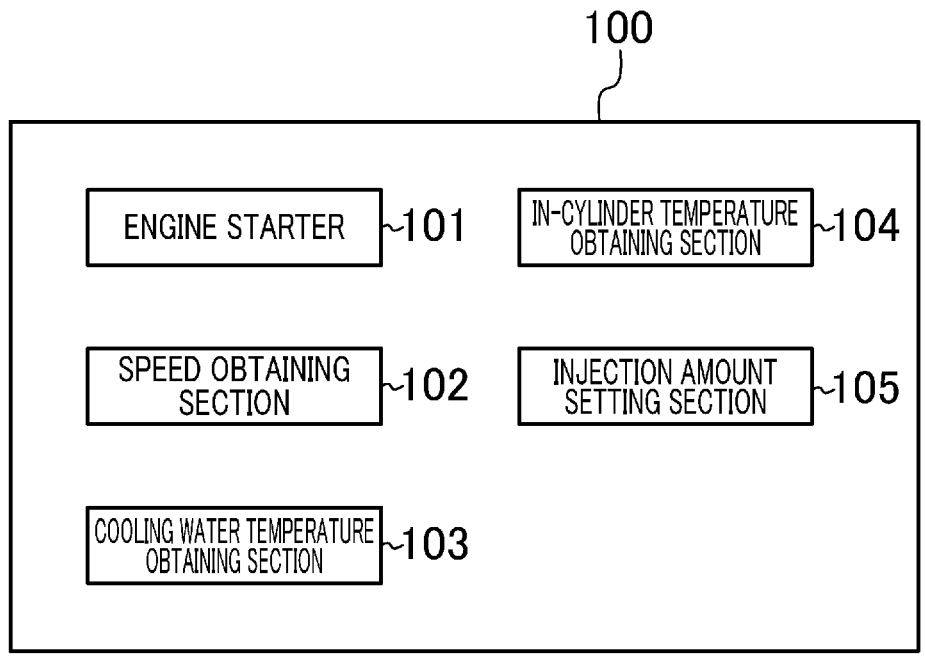
FIG. 5 is a diagram illustrating a configuration of a PCM.

Among the functions of the PCM 100, the start control functions for the engine 1 will be particularly described in detail below. FIG. 5 is a diagram illustrating a configuration of a PCM 100. As shown in FIG. 5, the PCM 100 includes the following as functional elements relating to the start control of the engine 1: an engine starter 101 which increases the engine speed to a predetermined idle speed Ri; a speed obtaining section 102 which obtains the engine speed; a cooling water temperature obtaining section 103 which obtains the temperature of the engine cooling water; an in-cylinder temperature obtaining section 104 which obtains the temperature inside the combustion chambers 14a (hereinafter referred to as an "in-cylinder temperature") based on the water temperature; and an injection amount setting section 105 which sets the fuel injection amount injected by the injectors 18 based on the engine speed and the in-cylinder temperature.

The engine starter 101 performs cranking and increases the engine speed to the idle speed Ri after completion of the cranking. Specifically, to start the engine 1, the engine starter 101 inputs a control signal to the starter motor 91. Once the control signal is input from the engine starter 101, the starter motor 91 rotates and drives the crankshaft 15. This rotation starts cranking of the engine 1. When the engine speed rises to a predetermined speed as a result of the cranking, the engine starter 101 completes the cranking and starts the start-up operation of the engine 1. When the engine speed rises to the idle speed Ri as a result of the start-up operation of the engine 1, the engine starter 101 completes the start-up operation of the engine 1.

The speed obtaining section 102 detects or estimates the engine speed based on the detection signal of the crank angle sensor SW1, and outputs a signal corresponding to the detected or estimated value to the injection amount setting section 105.

Specifically, in the idle operation of the engine 1 and the normal operation of the engine 1 (while the vehicle V travels), the speed obtaining section 102 obtains, prior to fuel injection in the (n+1)-th cycle, an engine speed which can be achieved by combustion in a cycle before the (n+1)-th cycle (i.e., combustion at or prior to an n-th cycle), where n is a positive integer, for example. The speed obtaining section 102 also generates a signal corresponding to the obtained engine speed, and outputs the signal to the injection amount setting section 105.

In the following description, the term "cycle" is not limited to when the fuel is burnt in the combustion chamber 14a. For example, completion of a set of reciprocating movements corresponding to an intake stroke, a compression stroke, an expansion stroke, and an exhaust stroke by the piston 14 at the time of cranking is assumed to be completion of one cycle. In other words, the term "cycle" as used herein also includes when the fuel injection amount is zero.

Further, the "cycle" in the following description is not counted up independently for each cylinder, but is counted up for all the cylinders together. In view of the fact that one cycle completes in each cylinder 11a every time the crankshaft 15 turns 720 degrees, the number of the cycles is incremented by one every time the crankshaft 15 turns 180 degrees in a case, for example, of a 4-cylinder engine in which the cylinders are offset by 180 degrees.

Figure 6:
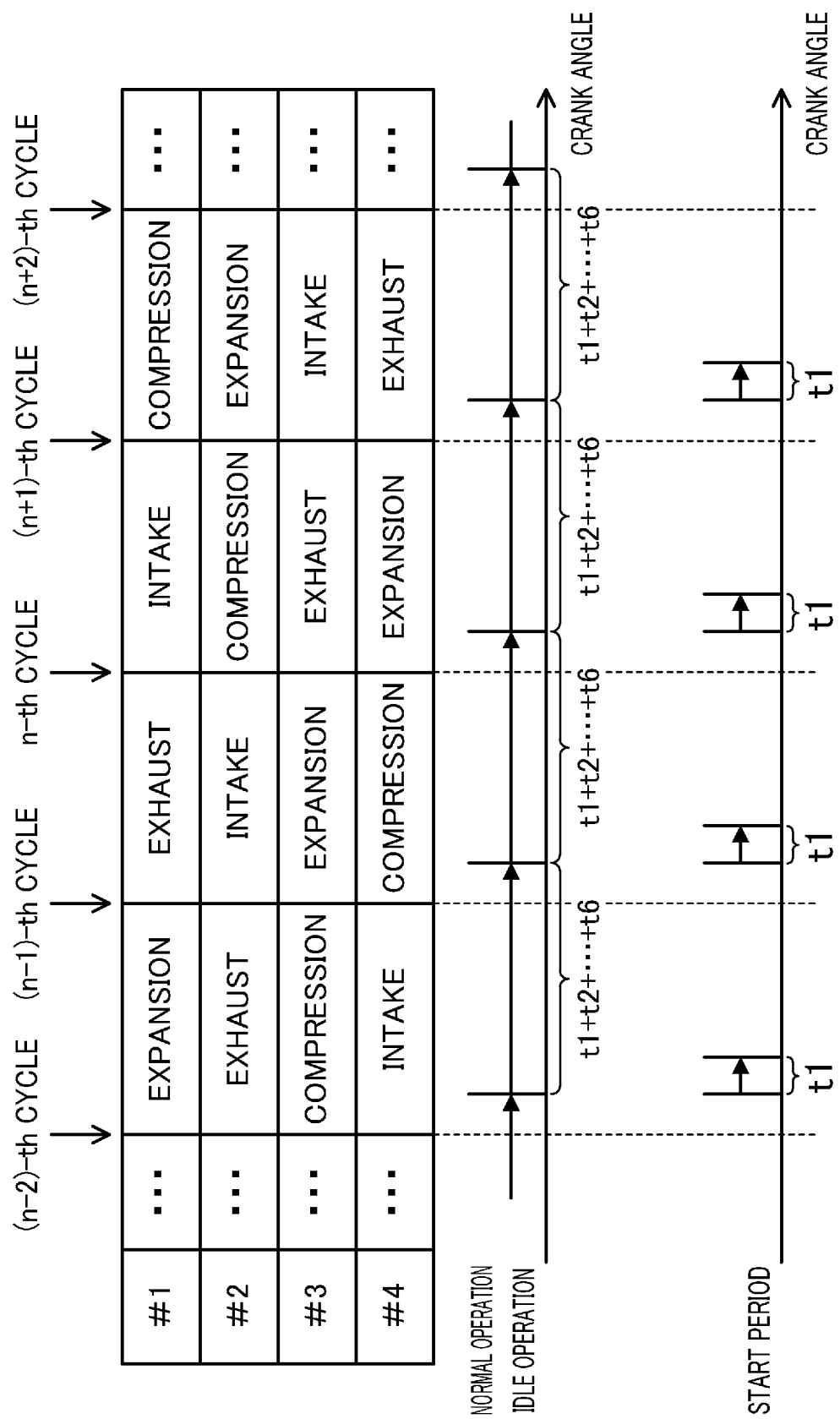
FIG. 6 is a diagram for explaining a method of obtaining an engine speed.
Figure 7:
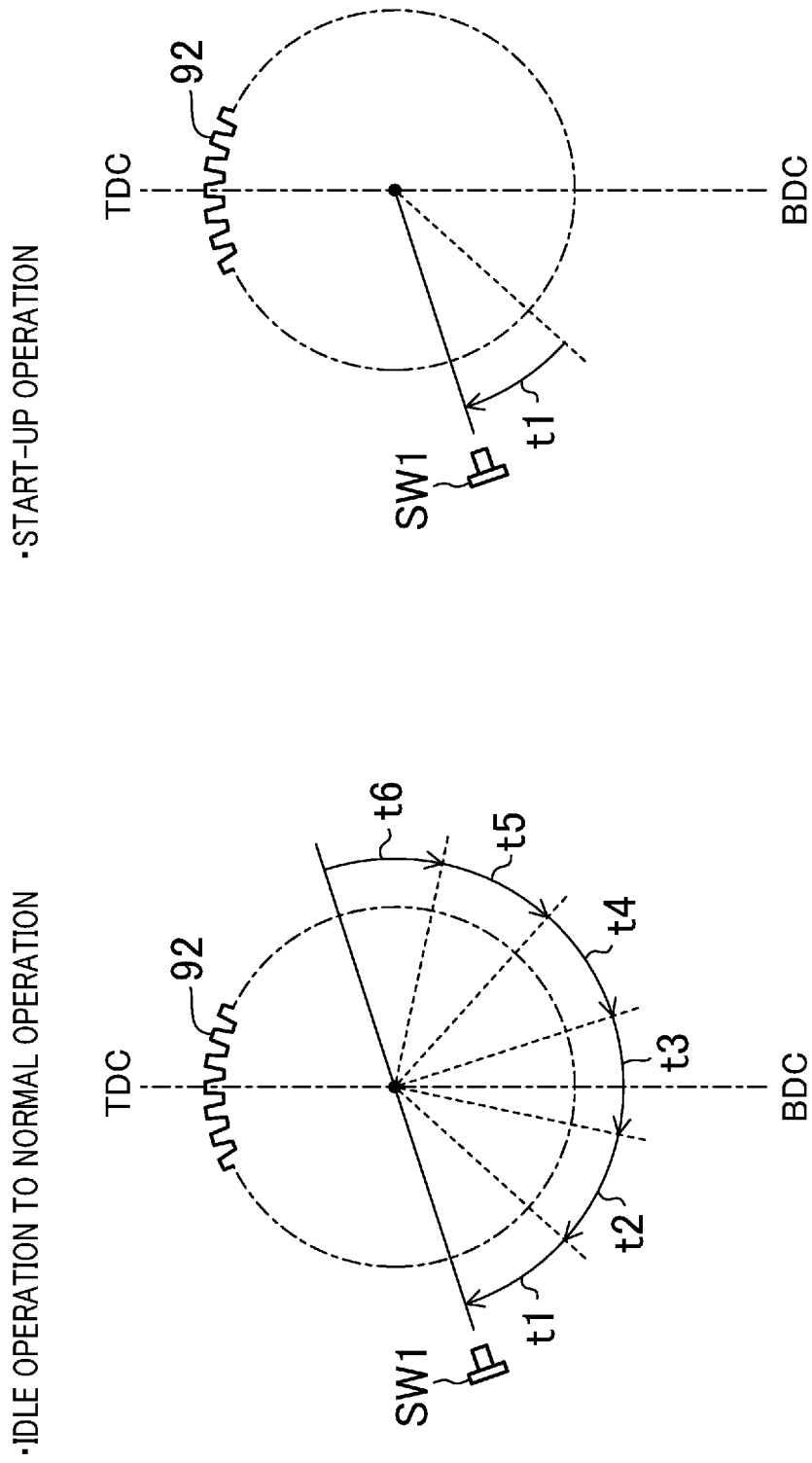
FIG. 7 is a diagram for explaining the method of obtaining the engine speed.

FIGS. 6 and 7 are diagrams for explaining a method of obtaining an engine speed. The four cylinders 11a shown in FIG. 6 will be referred to as a first cylinder (#1), a second cylinder (#2), a third cylinder (#3), and a fourth cylinder (#4) arranged sequentially along the cylinder bank. That is, in the engine 1, combustion occurs sequentially in the #1, #3, #4, and #2 every time the crankshaft 15 turns 720 degrees. As shown in FIG. 6, the number of the cycles is incremented by one every time combustion occurs in the respective cylinders 11a.

As shown in FIG. 7, in the idle and normal operations, the speed obtaining section 102 obtains the engine speed based on the time (t1+t2+, . . . , +t6 shown in FIG. 6) spent while the crank angle associated with one of the cylinders (e.g., the fourth cylinder (#4)) which is to perform combustion in the n-th combustion cycle moves from the first half of the intake stroke to the first half of the compression stroke, through the intake bottom dead center. As shown in FIG. 7, ti, where i is a positive integer, represents time spent while the trigger plate 92 turns 30 degrees. That is, in the examples illustrated in FIGS. 6 and 7, the engine speed is obtained based on the time spent while the trigger plate 92 turns 180 degrees. Such a method in which the time spent in the intake stroke is taken into account is more advantageous in securing the accuracy of the engine speed in a normal operation, compared to when only the compression stroke is taken into account, because the rotational speed of the crankshaft 15 in the normal operation is higher than at the start of the engine.

However, at the start of the engine 1, variations of the engine speed with respect to time are relatively large, compared for example to those at the idle operation, because there is a greater influence of the inertia of the flywheel at the start of the engine 1. Thus, the accuracy in detecting the engine speed may be deteriorated by taking into account the length of time spent while the trigger plate 92 turns 180 degrees as in the above method. For this reason, the above method is not suitable as a method of obtaining, at the start of engine, the engine speed achieved by the combustion in the previous (n−1)-th cycle before setting the fuel injection amount in the n-th cycle.

To address this problem, in a period after the engine 1 starts cranking until the engine speed reaches a predetermined idle speed (hereinafter referred to as a "start period"), the speed obtaining section 102 obtains the engine speed based on the time spent (t1 in FIGS. 6 and 7) when the ignition timing is advanced in the first half of the compression stroke, as illustrated in FIG. 6. The first half of the compression stroke is the timing immediately before the start of fuel injection, and when the speed variations caused by the previous combustion converge. Obtaining the engine speed based on the time t1 spent at this timing is thus advantageous in securing the accuracy in detecting the engine speed.

In this manner, in the start period, the speed obtaining section 102 obtains, before fuel injection in the (n+1)-th combustion cycle, the engine speed (hereinafter may be referred to as a "present engine speed") achieved by the combustion in the previous n-th combustion cycle. Then, the speed obtaining section 102 generates a signal corresponding to the present engine speed, and outputs the signal to the injection amount setting section 105.

The cooling water temperature obtaining section 103 detects the temperature of the engine cooling water based on the detection signal of the water temperature sensor SW8, and outputs a signal corresponding to the detected value to the in-cylinder temperature obtaining section 104.

The in-cylinder temperature obtaining section 104 detects or estimates the in-cylinder temperature based on the value detected by the cooling water temperature obtaining section 103, and outputs a signal corresponding to the detected or estimated value to the injection amount setting section 105.

The injection amount setting section 105 sets, within the start period described above, the amount of fuel to be injected by the injectors 18 in the next and subsequent cycles based on the engine speed detected or estimated by the speed obtaining section 102, and the in-cylinder temperature detected or estimated by the in-cylinder temperature obtaining section 104.

As described above, the resonance speed Rr causing resonance in the powertrain PT is lower than the idle speed Ri. Thus, the engine speed may pass by the resonance speed Rr during the start period. If this happens, the engine 1 and hence the engine powertrain PT may vibrate.

To address this problem, the present inventors found the following configuration which prevents the engine speed from reaching near the resonance speed Rr through the processing of the injection amount setting section 105, and which, even if the engine speed reaches the resonance speed Rr, can reduce vibrations associated with the resonance as soon as possible.

Figure 4:
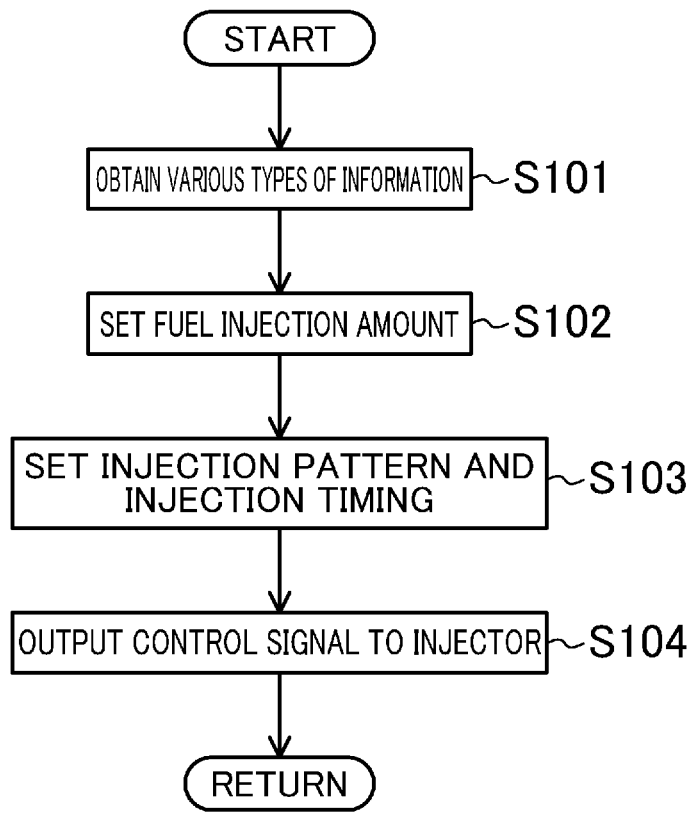
FIG. 4 is a flowchart illustrating a process of controlling an injector.

FIG. 4 illustrates a control process associated with fuel injection. As illustrated in FIG. 4, the PCM 100 obtains various types of information, based on the detection signals obtained from the sensors (step S101). For example, the PCM 100 obtains the engine speed, the accelerator position, the temperature of cooling water, and so on. Then, based on the information obtained in step S101, the PCM 100 sets a target amount of the fuel to be injected to the combustion chambers 14a (hereinafter referred to as a "fuel injection amount") (step S102), and sets the injection pattern and injection timing at the execution of the fuel injection (step S103). After that, the PCM 100 generates control signals corresponding to the settings in steps S102 to S103, and inputs to the injectors 18 (step S104).

Among the start control processes of the engine 1, particularly a process associated with the setting of fuel injection amount will be described in detail below.

(Process of Setting Fuel Injection Amount)

Figure 8:
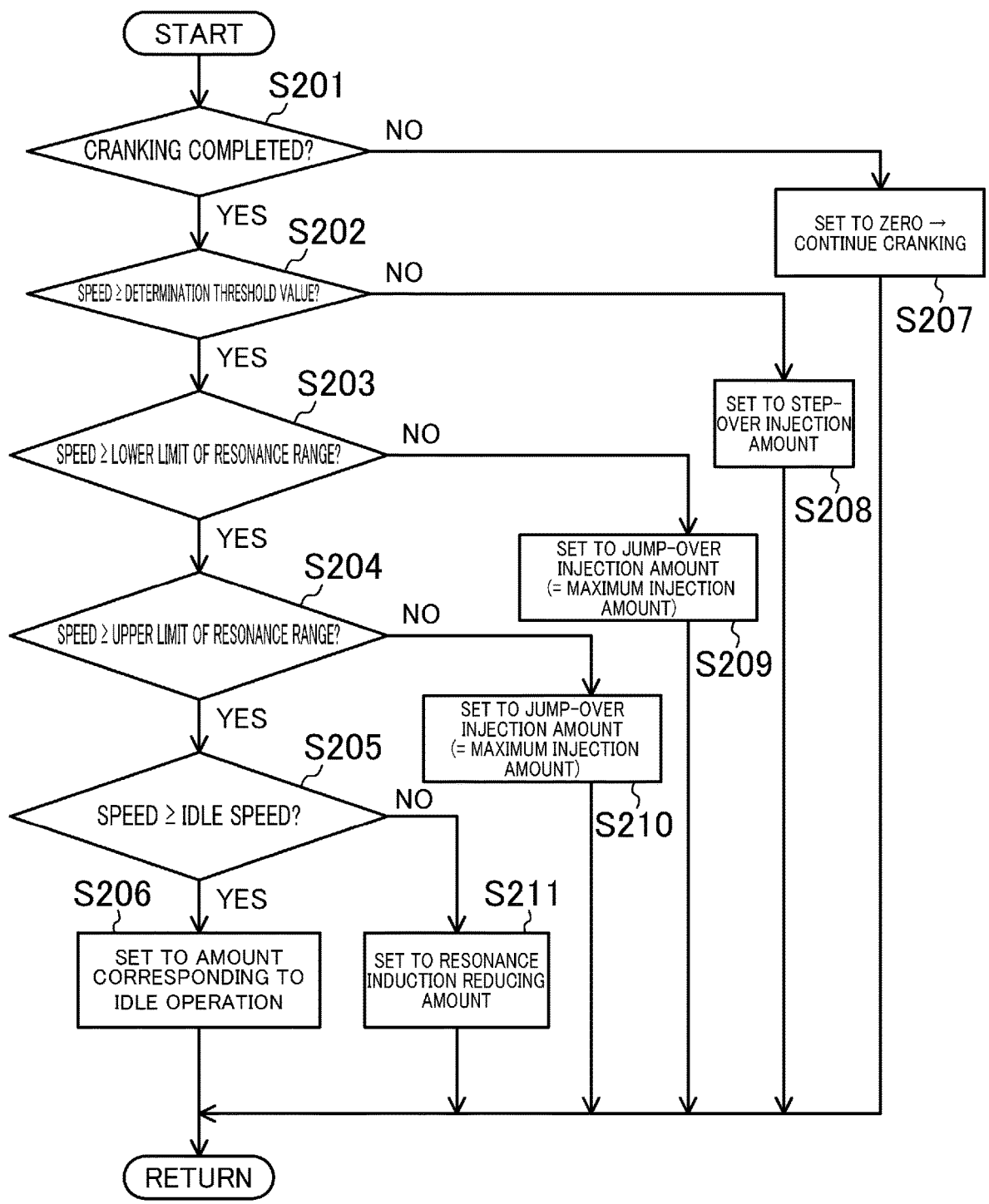
FIG. 8 is a flowchart illustrating a process of setting the fuel injection amount.
Figure 9:
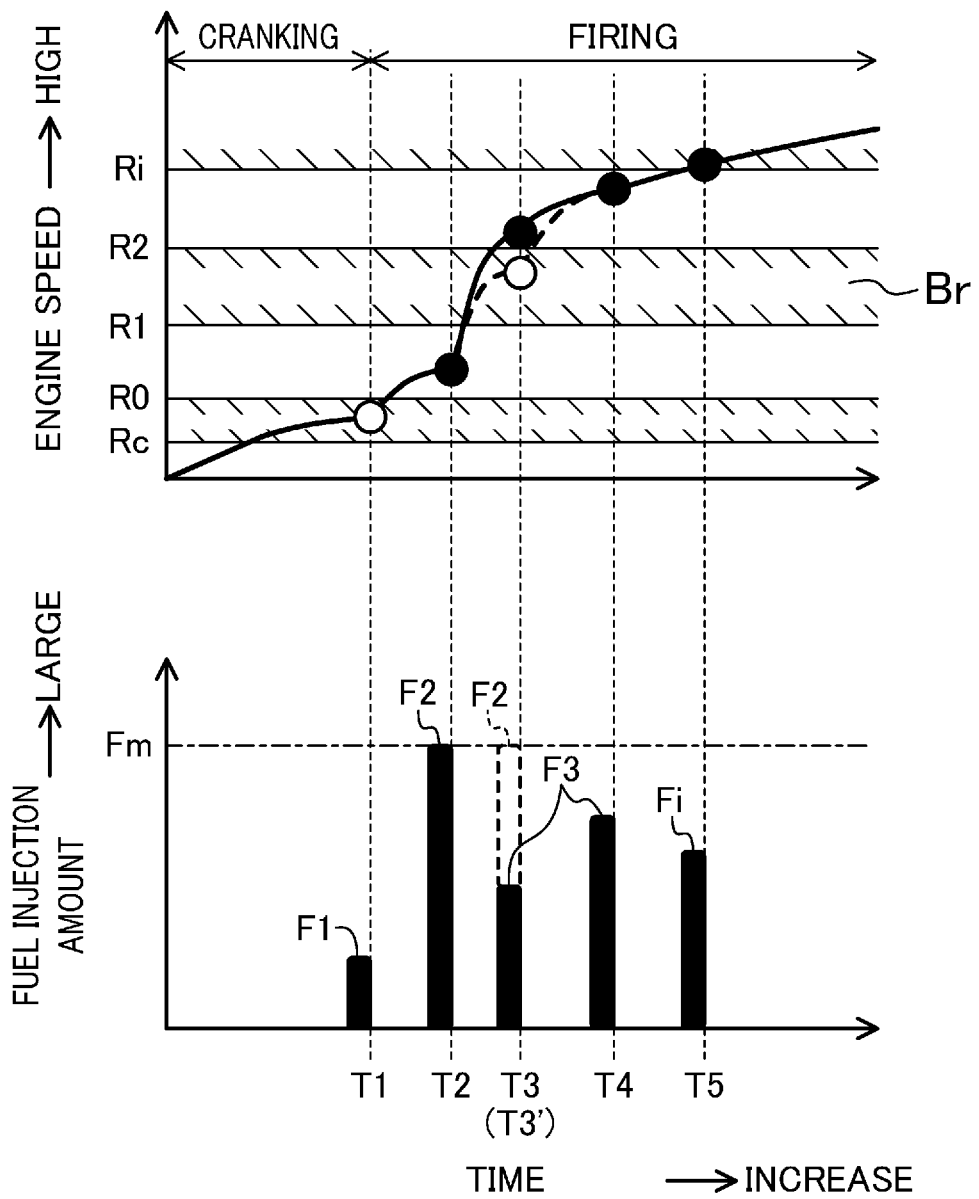
FIG. 9 is a time chart illustrating changes in the engine speed and changes in the fuel injection amount at start of the engine.
Figure 10:
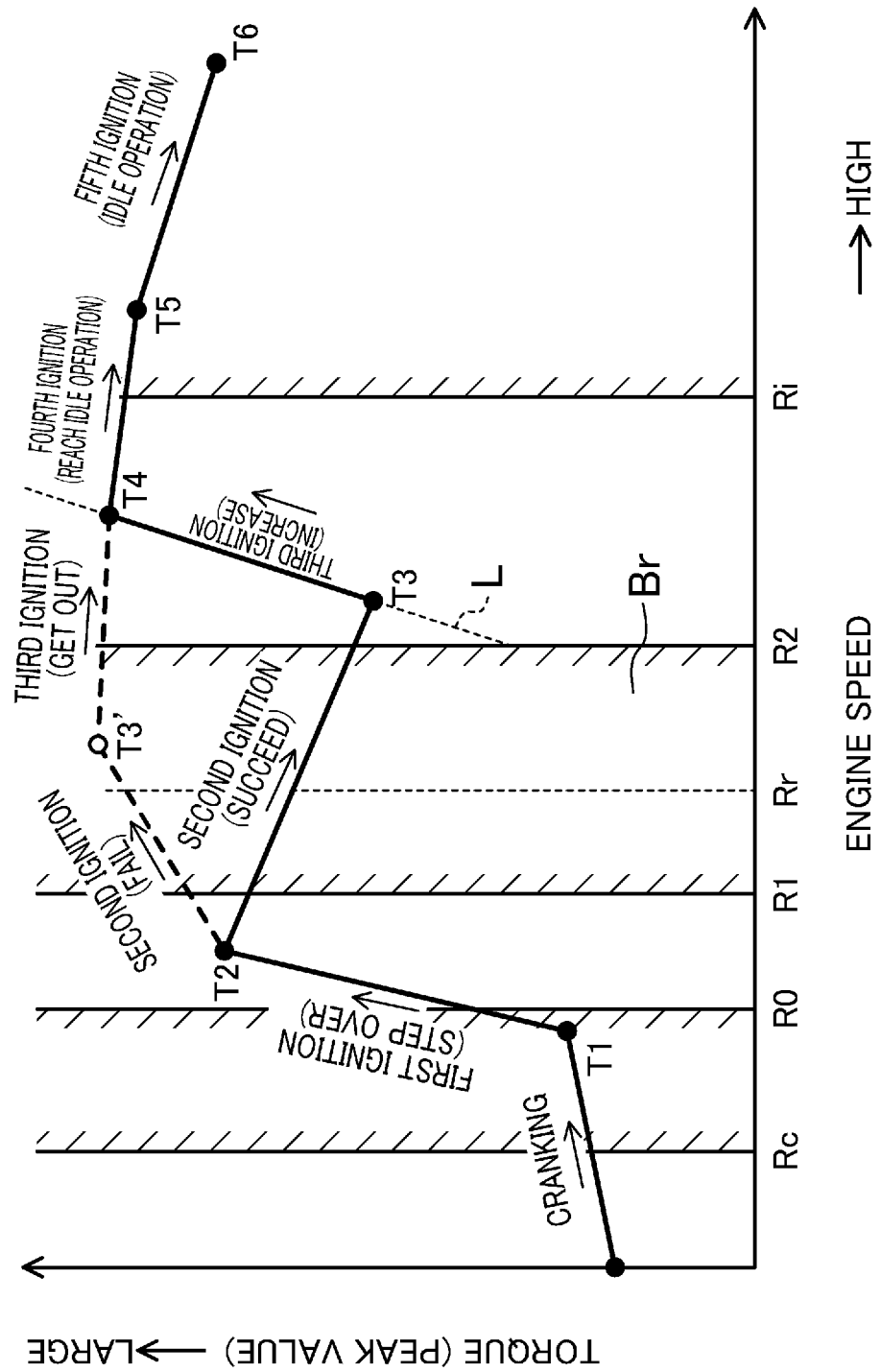
FIG. 10 is a diagram illustrating changes in the torque with respect to the engine speed.

FIG. 8 is a flowchart illustrating a process of setting the fuel injection amount. The process shown in FIG. 8 is an example process according to step S102 of FIG. 6. FIG. 9 is a time chart illustrating changes in the engine speed and changes in the fuel injection amount at start of the engine. FIG. 10 is a diagram illustrating changes in the torque with respect to the engine speed.

In the process shown in FIG. 8, the injection amount setting section 105 sets the fuel injection amount to be smaller than or equal to a predetermined maximum injection amount Fm. The maximum injection amount Fm is determined according to the vaporization characteristics of the fuel, specifically, the above-mentioned in-cylinder temperature. The maximum injection amount Fm is larger when the in-cylinder temperature is low, than when the in-cylinder temperature is high. Specifically, the fuel injected into the combustion chamber 14a is less likely to be vaporized with a decrease in the in-cylinder temperature. This means that more fuel is allowed to be injected when the in-cylinder temperature is low, than when the in-cylinder temperature is high, because less fuel is vaporized when the in-cylinder temperature is low. This feature defines the characteristics of the maximum injection amount Fm with respect to the in-cylinder temperature.

Once the process shown in FIG. 8 starts, the injection amount setting section 105 determines in step S201 whether cranking has been completed or not. This determination is made based on whether or not the engine speed is higher than or equal to a cranking determination value Rc illustrated in FIGS. 9 and 10. The cranking determination value Rc is determined in advance in accordance with, for example, the configuration of the engine 1. For example, if the engine speed is lower than the cranking determination value Rc, the section determines that the cranking has not been completed and concludes NO. If the determination is NO, the process proceeds to step S207. In step S207, the injection amount setting section 105 sets the fuel injection amount to zero, and continues cranking.

In the example illustrated in FIGS. 9 and 10, it is assumed that the engine speed has reached and exceeded the cranking determination value Rc at T1 as a result of the cranking performed from the first cycle to the (n–2) cycle. In this case, the injection amount setting section 105 determines that the cranking is completed and concludes YES in step S201. If the determination is YES, the process proceeds from step S201 to step S202 so that cranking shifts to firing.

The PCM 100 stores a range (hereinafter referred to as a "resonance range") Br which includes the resonance speed Rr as an index for determining whether the engine speed reaches near the resonance speed Rr or not. The injection amount setting section 105 is configured to determine that the engine speed has reached near the resonance speed Rr when the engine speed falls in the resonance range Br. Note that the resonance range Br is an example of the "resonance speed range."

The lower limit R1 and the upper limit R2 of the resonance range Br are set as thresholds of a range in which the acceleration at the time when the engine 1 vibrates, and hence when the powertrain PT vibrates, falls within a predetermined range. The lower limit R1 is higher than the cranking determination value Rc described above. The upper limit R2 is lower than the idle speed Ri. That is, the resonance range Br according to the present embodiment refers to a speed range higher than the cranking determination value Rc and lower than the idle speed Ri.

In step S202, the injection amount setting section 105 determines whether or not the engine speed is higher than or equal to a predetermined determination threshold value R0. The determination threshold value R0 is defined in advance. The determination threshold value R0 is greater than the cranking determination value Rc, and smaller than the lower limit R1 of the resonance range Br. Note that the determination threshold value R0 is an example of the "reference speed."

If the determination is YES in step S202, the process proceeds to step S203. If the determination is NO, the process proceeds to step S208. If the determination is No, the injection amount setting section 105 sets the fuel injection amount to a predetermined step-over injection amount F1, and the process goes to Return. Although not described in detail, the step-over injection amount F1 is set such that when the fuel injection with the step-over injection amount F1 is performed, the engine speed achieved by the combustion associated with the fuel injection is higher than or equal to the determination threshold value R0 and lower than the lower limit R1 of the resonance range Br. The step-over injection amount F1 is smaller than the maximum injection amount Fm described above (i.e., step-over injection amount<maximum injection amount).

In the example illustrated in FIGS. 9 and 10, the engine speed at T1 is lower than the determination threshold value R0. Thus, the injection amount setting section 105 proceeds to step S208, and sets the fuel injection amount for the (n–1)-th cycle to the step-over injection amount F1. In this case, the engine speed achieved by the combustion in the (n–1)-th cycle (i.e., the first ignition) is higher than the determination threshold value R0 as a reference speed and lower than the lower limit R1 of the resonance range Br, as shown at T2 in FIGS. 9 and 10. Thus, the injection amount setting section 105 proceeds to step S203 to set the fuel injection amount for the n-th cycle (i.e., the second ignition).

In step S203, the injection amount setting section 105 determines whether or not the engine speed is higher than or equal to the lower limit R1 of the resonance range Br. If the determination is YES, the process proceeds to step S204. If the determination is NO, the process proceeds to step S209. If the determination is No, the injection amount setting section 105 sets the fuel injection amount to a predetermined jump-over injection amount F2, and the process goes to Return. The jump-over injection amount F2 is an example of the "first injection amount."

The jump-over injection amount F2 according to the present embodiment is equal to the maximum injection amount Fm described above (i.e., jump-over injection amount=maximum injection amount). Thus, the jump-over injection amount F2 is larger than the step-over injection amount F1 described above (jump-over injection amount>step-over injection amount). If the fuel injection amount is set to the jump-over injection amount F2, the engine speed is increased more significantly by an increased amount of the fuel injected, than in the case, for example, where the fuel injection amount is set to the step-over injection amount F1.

In the example illustrated in FIGS. 9 and 10, the engine speed at T2 is higher than or equal to the determination threshold value R0, and lower than the lower limit R1 of the resonance range Br, as described above. In such a case, the injection amount setting section 105 sets the fuel injection amount for the n-th cycle to the jump-over injection amount F2. When the set amount of fuel is injected and the injected fuel is burnt, the engine speed increases more significantly, compared to the engine speed achieved by the combustion in the (n−1)-th cycle. This is advantageous in increasing the engine speed, by the combustion in one cycle, from a value smaller than the lower limit R1 of the resonance range Br to a value greater than the upper limit R2 (hereinafter referred to as "jumping over the resonance range Br") as illustrated, for example, by the solid line connecting T2 and R3 in FIG. 10.

However, as illustrated by the broken line connecting T2 and T3', even if the maximum injection amount Fm is set as the jump-over injection amount F2, the engine speed does not always jump over the resonance range Br successfully. For example, the maximum injection amount Fm increases and decreases in accordance with the in-cylinder temperature. In addition, the engine speed achieved by the fuel injection based on the maximum injection amount Fm increases and decreases according to the temperature of the intake air. For example, when the temperature of the intake air is high, the air density is relatively low, and the in-cylinder oxygen concentration may thus become insufficient. In such a case, the obtainable torque is relatively low even if the same amount of fuel is injected, which may result in an insufficient increase in the engine speed, and hence the unsuccessful jumping over the resonance range Br. Furthermore, the resonance range Br may change in accordance with the external environment. Specifically, elastic properties of the engine mount 204 change with a decrease in the outside air temperature. As a result, the acceleration at the time when the powertrain PT vibrates changes, and hence the lower limit R1 and the upper limit R2 of the resonance range Br also change. Because of such circumstances, the engine speed achieved by the combustion in the n-th cycle may fall in the resonance range Br.

To address this problem, when the engine speed falls in the resonance range Br, the injection amount setting section 105 according to the present embodiment executes processing for immediately reducing vibrations caused by such engine speed.

Specifically, in step S204, the injection amount setting section 105 determines whether or not the engine speed is higher than or equal to the upper limit R2 of the resonance range Br. If the determination is YES, that is, if the engine speed successfully jumps over the resonance range Br, the process proceeds to step S205. If the determination is No, that is, if the engine speed fails to jump over the resonance range Br, the process proceeds to step S210. If the determination is No, the injection amount setting section 105 sets the fuel injection amount to the jump-over injection amount F2, and the process goes to Return. As mentioned earlier, the jump-over injection amount F2 is equal to the maximum injection amount Fm.

The fuel injection amount which is set to the jump-over injection amount F2 increases the engine speed significantly as in the processing in step S209 described above.

In the example illustrated in FIGS. 9 and 10, the engine speed falls in the resonance range Br at T3', which means that the engine speed fails to jump over the resonance range Br, as mentioned earlier. In such a case, the injection amount setting section 105 sets the fuel injection amount for the (n+1)-th cycle (i.e., the third ignition) to the jump-over injection amount F2 again. When the set amount of fuel is injected and the injected fuel is burnt, the engine speed increases significantly, similarly to the engine speed achieved by the combustion in the n-th cycle. This is advantageous in increasing the engine speed from a value within the resonance range Br to a value greater than or equal to the upper limit R2 of the resonance range Br (hereinafter referred to as "getting out of the resonance range Br") as illustrated by the broken line connecting T3' and T4 in FIG. 10.

Note that the jump-over injection amount F2 is not necessarily equal to the maximum injection amount Fm. The jump-over injection amount F2 may be at least larger than the fuel injection amount that is set when the engine speed is higher than or equal to the upper limit R2 of the resonance range Br. Specifically, the jump-over injection amount F2 may be larger than the fuel injection amount that is set for the cycle subsequent to the cycle in which the engine speed has successfully jumped over the resonance range Br, or larger than the fuel injection amount that is set for the cycle subsequent to the cycle in which the engine speed has gotten out of the resonance range Br.

Even if the engine speed successfully jumps over the resonance range Br, torque fluctuation may induce resonance immediately after the engine speed has passed through the resonance range Br (particularly when the engine speed is close to the upper limit R2).

To address this problem, when the engine speed successfully jumps over the resonance range Br, the injection amount setting section 105 according to the present embodiment executes processing for reducing the induction of resonance after the engine speed have passed through the resonance range Br.

Specifically, in step S205, the injection amount setting section 105 determines whether or not the engine speed is higher than or equal to the idle speed Ri. If the determination is NO, the process proceeds to step S211. If the determination is YES, the process proceeds to step S206 to start an idle operation. If the determination is YES, the injection amount setting section 105 sets the fuel injection amount to an amount Fi corresponding to the idle operation, and the process goes to Return.

If the determination is NO in step S205, that is, when the engine speed successfully jumps over or gets out of the resonance range Br but fails to reach the idle operating state, the injection amount setting section 105 sets the fuel injection amount for the next and subsequent combustion cycles to a predetermined resonance induction reducing amount F3, and the process goes to Return. The resonance induction reducing amount F3 is at least smaller than the jump-over injection amount F2 that is set so as to jump over the resonance range Br (i.e., resonance induction reducing amount<jump-over injection amount). This is advantageous in reducing induction of the resonance, because the torque fluctuation decreases by the reduction in the resonance induction reducing amount F3.

Specifically, the injection amount setting section 105 calculates the difference ΔR between the engine speed (see T3 and T4 in FIG. 10) achieved in the cycles subsequent to when the engine speed has passed through the resonance range Br (specifically, in the cycles subsequent to when the engine speed has jumped over or gotten out of the resonance range Br) and the upper limit R2 of the resonance range Br. The section also sets the resonance induction reducing amount F3 to be smaller if the difference ΔR is small, than if the difference ΔR is large.

That is, the resonance induction reducing amount F3 is set not only for the cycle immediately after the engine speed has jumped over or gotten out of the resonance range Br, but also for cycles until the engine speed reaches the idle operating state.

FIG. 11 illustrates the fuel injection amount (i.e., the resonance induction reducing amount F3) at a time subsequent to when the engine speed has passed through the resonance range Br. As shown in FIG. 11, when the difference ΔR increases from zero to a predetermined resonance induction determination value Rt, the resonance induction reducing amount F3 increases with an increase in the difference ΔR, and reaches the maximum injection amount Fm. As the resonance induction reducing amount F3 increases, the torque generated by the combustion based on the resonance induction reducing amount F3 also increases along the straight line L of FIG. 11. The straight line L is defined based on the vibration characteristics of the powertrain PT. It is defined that acceleration according to the vibrations of the powertrain PT exceeds a tolerance range when the torque generated by the operation of the engine 1 exceeds the straight line L. Setting the fuel injection amount in accordance with the characteristics shown in FIG. 11 causes the engine 1 to output torque having a value along the straight line L, and thus allows the acceleration to fall within the tolerance range.

On the other hand, if the difference ΔR is larger than the resonance induction determination value Rt, the resonance induction reducing amount F3 is constant at the maximum injection amount Fm.

In the example illustrated in FIGS. 9 and 10, if the engine speed successfully jumps over the resonance range Br by the combustion in the n-th cycle (see T3 in FIGS. 9 and 10), the injection amount setting section 105 calculates the difference ΔR between the engine speed and the upper limit R2 of the resonance range Br, and sets, based on the obtained difference ΔR, the resonance induction reducing amount F3, which is smaller than the jump-over injection amount F2, as the fuel injection amount for the (n+1)-th cycle (i.e., the third ignition). When the set amount of fuel is injected and the injected fuel is burnt, the engine speed increases less significantly by the reduction in the resonance induction reducing amount F3, compared to the engine speed achieved by the combustion in the n-th cycle. As a result, in the example illustrated in FIGS. 9 and 10, as indicated by the solid line connecting T3 and T4, the engine speed achieved by the combustion in the (n+1)-th cycle is still lower than the idle speed Ri (see T4 in FIGS. 9 and 10). In such a case, the injection amount setting section 105 calculates the difference ΔR between the engine speed at that time and the upper limit R2 of the resonance range Br, and sets, based on the obtained difference ΔR, the fuel injection amount (the resonance induction reducing amount F3) for the (n+2)-th cycle (i.e., the fourth ignition). The resonance induction reducing amount F3 for the (n+2)-th cycle is set to be larger than that for the (n+1)-th cycle by an amount corresponding to the increase in the engine speed.

On the other hand, if the engine speed fails to jump over the resonance range Br by the combustion in the n-th cycle (see T3' in FIGS. 9 and 10), the injection amount setting section 105 sets the fuel injection amount for the (n+1)-th cycle to the jump-over injection amount F2, as mentioned earlier. In such a case, the injection amount setting section 105 sets the fuel injection amount for the subsequent (n+2)-th cycle (i.e., the fourth ignition) to the resonance induction reducing amount F3, which is smaller than the jump-over injection amount F2. That is, in the case of failing to jump over the resonance range Br, the fuel injection is executed based on the resonance induction reducing amount F3 in the cycles subsequent to when the engine speed gets out of the resonance range Br.

SUMMARY

As described above, when the engine speed (the present engine speed) achieved by the combustion in the n-th cycle falls in the resonance range Br, which is lower than the idle speed Ri, the injection amount setting section 105 sets the fuel injection amount for the (n+1)-th cycle to be larger than the fuel injection amount injected when the engine speed is higher than or equal to the upper limit R2 of the resonance range Br.

In this configuration, the fuel injection amount for the (n+1)-th cycle is determined by taking into account the present engine speed achieved by the combustion in the previous n-th cycle.

Specifically, when the present engine speed falls in the resonance range Br, the fuel injection amount for the (n+1)-th cycle is set to be larger than the fuel injection amount injected when the engine speed is higher than or equal to the upper limit R2 of the resonance range Br. The engine speed can quickly pass through the resonance range Br due to the increase in the fuel injection amount.

In other words, the engine speed is not increased to the idle speed Ri while maintaining a greater fuel injection amount, but is set to be smaller, when the present engine speed is higher than or equal to the upper limit R2 of the resonance range Br, than the fuel injection amount injected when the engine speed falls in the resonance range Br. It is therefore possible to reduce the torque fluctuation by an amount corresponding to the reduction in the fuel injection amount, and thus to reduce the forced vibration caused by the torque fluctuation. This is advantageous in reducing the combustion noise.

It is therefore possible to cause the engine speed to quickly pass through the resonance range Br, and reduce vibrations of a vehicle caused by torque fluctuation and reduce the combustion noise.

Further, when the present engine speed falls in the resonance range Br, the injection amount setting section 105 sets the fuel injection amount to be the maximum injection amount Fm determined in accordance with the temperature in the combustion chamber 14a.

This configuration is advantageous in that the engine speed can pass through the resonance range Br more quickly by the increased fuel injection amount than in a case, for example, where the fuel injection amount is set to be smaller than the maximum injection amount Fm.

The in-cylinder temperature obtaining section 104 detects or estimates the in-cylinder temperature based on the value detected by the cooling water temperature obtaining section 103.

Further, when the present engine speed falls in the resonance range Br, the injection amount setting section 105 sets the fuel injection amount to be larger than the fuel injection amount injected when the engine 1 is in the idle operation.

This configuration is advantageous in that the engine speed can quickly pass through the resonance range Br by the increased fuel injection amount.

Other Embodiments

The foregoing embodiment may also have the following structures.

The configuration of the engine 1 is a mere example, and not limited thereto. For example, while the engine 1 includes the turbo supercharger 61 in the above-described embodiment, the turbo supercharger 61 may be omitted.

DESCRIPTION OF REFERENCE CHARACTERS

1 Engine (Compression Ignition Engine)
14a Combustion Chamber
15 Crankshaft
18 Injector (Fuel Injection Valve)
91 Starter Motor
100 PCM (Control System)
101 Engine Starter
102 Speed Obtaining Section
103 Cooling Water Temperature Obtaining Section
104 In-Cylinder Temperature Obtaining Section
105 Injection Amount Setting Section
Ri Idle Speed
Rr Resonance Speed
Br Resonance Range (Resonance Speed Range)
R2 Upper Limit of Resonance Range (Upper Limit of Resonance Speed Range)
Fm Maximum Injection Amount (Limit Value)

The invention claimed is:

1. A method of controlling a compression ignition engine having a fuel injection valve which supplies fuel into a combustion chamber, the method comprising:
   an engine start step in which an engine speed is increased to a predetermined idle speed;
   a speed obtaining step in which a present engine speed is detected or estimated, the present engine speed being an engine speed achieved by combustion in an n-th cycle, where n is a positive integer;
   an injection amount setting step in which a fuel injection amount to be injected by the fuel injection valve in an (n+1)-th cycle is set, based on the present engine speed, in a period until the engine speed reaches the idle speed, and
   an in-cylinder temperature obtaining step in which a temperature in the combustion chamber is detected or estimated, wherein
   the injection amount setting step includes, if the present engine speed falls in a resonance speed range which is lower than the idle speed, setting the fuel injection amount to be larger than the fuel injection amount injected when the engine speed is higher than or equal to an upper limit of the resonance speed range, and
   the injection amount setting step includes, if the present engine speed falls in the resonance speed range, setting the fuel injection amount to be a limit value determined in accordance with the temperature in the combustion chamber.

2. The method of claim 1 further comprising:
a cooling water temperature obtaining step in which a temperature of engine cooling water is detected, wherein
the in-cylinder temperature obtaining step may include detecting or estimating the temperature in the combustion chamber, based on a value detected in the cooling water temperature obtaining step.

3. The method of claim 1, wherein
the injection amount setting step includes, if the present engine speed falls in the resonance speed range, setting the fuel injection amount to be larger than a fuel injection amount that is set when the compression ignition engine is in an idle operation.

4. A system for controlling a compression ignition engine having a fuel injection valve which supplies fuel into a combustion chamber, the system comprising:
   an engine starter which increases an engine speed to a predetermined idle speed;
   a speed obtaining section which detects or estimates a present engine speed which is an engine speed achieved by combustion in an n-th cycle, where n is a positive integer;
   an injection amount setting section which sets a fuel injection amount to be injected by the fuel injection valve in an (n+1)-th cycle, based on the present engine speed, in a period until the engine speed reaches the idle speed, and
   an in-cylinder temperature obtaining section which detects or estimates a temperature in the combustion chamber, wherein
   if the present engine speed falls in a resonance speed range which is lower than the idle speed, the injection amount setting section sets the fuel injection amount to be larger than the fuel injection amount injected when the engine speed is higher than or equal to an upper limit of the resonance speed range, and
   if the present engine speed falls in the resonance speed range, the injection amount setting section sets the fuel injection amount to be a limit value determined in accordance with the temperature in the combustion chamber.

5. The system of claim 4 further comprising:
a cooling water temperature obtaining section which detects a temperature of engine cooling water, wherein
the in-cylinder temperature obtaining section detects or estimates the temperature in the combustion chamber, based on a value detected by the cooling water temperature obtaining section.

6. The system of claim 4, wherein
if the present engine speed falls in the resonance speed range, the injection amount setting section sets the fuel injection amount to be larger than a fuel injection amount that is set when the compression ignition engine is in an idle operation.

* * * * *